Horace N. Eames.

assignor of Olmsted and Jones.

Improvment in Halter Rings

4295

REISSUED MAR 14 1871

Witnesses

N. B. Smith

D. C. Markham

Horace N. Eames

Inventor

By C. W. Smith

Attorney

United States Patent Office.

HORACE N. EAMES, OF NEWPORT, ASSIGNOR TO HIRAM R. OLMSTEAD AND RICHARD W. JONES, OF SYRACUSE, NEW YORK.

Letters Patent No. 100,384, dated March 1, 1870; reissue No. 4,295, dated March 14, 1871.

IMPROVEMENT IN HARNESS-RINGS.

The Schedule referred to in these Letters Patent and making part of the same.

*To all whom it may concern:*

Be it known that I, HORACE N. EAMES, of Newport, in the county of Herkimer and State of New York, assignor to Hiram R. Olmstead and Richard W. Jones, composing the firm of Olmstead & Jones, of the city of Syracuse, New York, have invented certain new and useful Improvements in Halter-Rings; and I do hereby declare that the following is a full, clear, and exact description thereof, reference being had to the accompanying drawing and to the letters of reference marked thereon.

Similar letters of reference designate identical parts in each of the figures.

This invention relates to an improved ring, to be used principally on halters and other head-gear of that kind; and It consists in providing one or more radial projections upon the otherwise plain surface of the ring, said projections having slots therein for the purpose hereinafter described, such slots in the crown and nose-band rings being on a plane with the body of the ring, and the slot in the choke-ring being transverse to the body of the ring, and the ring being diminished outside of said projections to a size sufficient only to maintain the strain upon its ring, the ring to be made light or heavy, according to the uses to which it is to be applied.

In the annexed drawing which forms a part of this specification—

E E are the crown-rings, having slots A B.

F F are the nose-band rings, with slots C D.

G is the choke-ring, having slot S.

Figure 1:
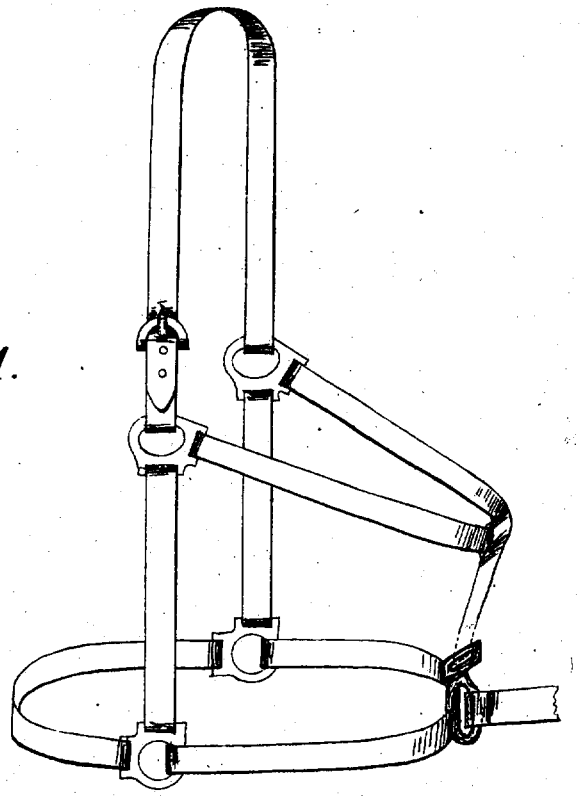
Figure 1 is a perspective view of a halter, as constructed and in readiness for use, with my improved rings attached.
Figure 2:
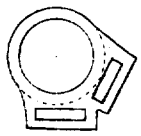
Figure 2 is a detached elevation of the crown-ring, the dotted lines indicating a plain ring, its custom being unbroken by any irregular projections.
Figure 3:
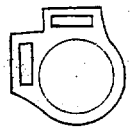
Figure 3 is a detached view of the nose-band ring.
Figure 4:
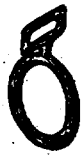
Figure 4 is a detached view of the choke-ring, having a slotted attachment transverse to the ring proper.

To the rings E, F, and G, thus constructed, may be secured the leather parts of a halter, as shown in fig. 1 of the drawing.

When a strap approaches a ring in a horizontal direction, as in the case of the nose-band strap, the ring tends to support it in its normal position.

I do not confine myself to the use of these rings on halters, but claim their general application to other head-gear of that kind, and the rings E and F may be used upon the breeching for harness.

What I claim as my invention, and desire to secure by Letters Patent, is—

A harness-ring, having one or more radial projections constructed on a plane with the body of the ring, and having straight slots cut therein, substantially as described.

HORACE N. EAMES.

Witnesses:

A. S. BANDER,
A. M. MILES,
F. L. HOFFMAN.